(12) United States Patent  
Chen et al.

(10) Patent No.: US 8,755,017 B2
(45) Date of Patent: Jun. 17, 2014

(54) ELECTRONIC APPARATUS, LIQUID CRYSTAL DISPLAY AND MANUFACTURING METHOD THEREOF

(75) Inventors: Yuqiong Chen, Beijing (CN); Dan Wang, Beijing (CN); Honglin Zhang, Beijing (CN); Hebin Zhao, Beijing (CN); Ting Dong, Beijing (CN); Wei Yan, Beijing (CN)

(73) Assignees: BOE Technology Group Co., Ltd., Beijing (CN); Beijing BOE Display Technology Co., Ltd., Beijing (CN)

( * ) Notice: Subject to any disclaimer, the term of this patent is extended or adjusted under 35 U.S.C. 154(b) by 27 days.

(21) Appl. No.: 13/469,151

(22) Filed: May 11, 2012

(65) Prior Publication Data

US 2012/0287370 A1 Nov. 15, 2012

(30) Foreign Application Priority Data

May 12, 2011 (CN) .......................... 2011 1 0123134

(51) Int. Cl.
*G02F 1/1339* (2006.01)
(52) U.S. Cl.
USPC ........................................................ 349/153
(58) Field of Classification Search
USPC ........................................................ 349/153
See application file for complete search history.

(56) References Cited

U.S. PATENT DOCUMENTS

2011/0222013 A1* 9/2011 Kawanishi et al. ........... 349/153

FOREIGN PATENT DOCUMENTS

KR 20070069924 A 7/2007

OTHER PUBLICATIONS

KIPO Office Action dated Sep. 25, 2013; Appln. No. 10-2012-0050246.
Korean Notice of Rejection dated Feb. 25, 2014; Appln No. 10-2012-0050246.

* cited by examiner

*Primary Examiner* — Phu Vu
(74) *Attorney, Agent, or Firm* — Ladas & Parry LLP

(57) ABSTRACT

Embodiments of the disclosed technology provide a liquid crystal display comprising: a first substrate including a base substrate and films formed on the base substrate; a second substrate, the periphery of the first substrate and the periphery of the second substrate being bonded together with use of a sealant; and a liquid crystal layer, filled in a closed space which is located between the first substrate and the second substrate, wherein the closed space includes an active region and a dummy region, and a total thickness of the film formed in correspondence to the active region is smaller than a total thickness of the film formed in correspondence to the dummy region. Embodiments of the disclosed technology also provide an electronic apparatus and a method of manufacturing the liquid crystal display.

4 Claims, 2 Drawing Sheets

ELECTRONIC APPARATUS, LIQUID CRYSTAL DISPLAY AND MANUFACTURING METHOD THEREOF

CROSS REFERENCE TO RELATED APPLICATIONS

This application claims the benefit to Chinese Application No. 201110123134.9, filed May 12, 2011, the entire disclosure of which is incorporated herein by reference.

BACKGROUND

Embodiments of the disclosed technology relate to an electronic apparatus, a liquid crystal display and a method of manufacturing the liquid crystal display.

The world has come into a time of "information revolution", and display technologies and display devices play a greatly important role in the course of development of the information technology. Display panels on portable devices such as televisions, computers, mobile phones, BPs, PDAs, etc. and on various instruments and meters provide the daily life and work of people with a vast amount of information.

A manufacturing procedure of a liquid crystal display comprises: an array substrate manufacturing process, a color filter substrate manufacturing process, and a liquid crystal cell manufacturing process (a liquid crystal dropping and substrate bonding process). The liquid crystal cell manufacturing process comprises steps of: coating a sealant on the periphery of an array substrate; dropping liquid crystal material in an active region which is located at the center of a color filter substrate; bonding the color filter substrate and the array substrate together and sealing the liquid crystal material with the sealant, after the prepared color filter substrate and array substrate are precisely aligned with a pixel-to-pixel basis; and then cutting the bonded substrates into a finally required size of the display panel.

When liquid crystal is dropped on the color filter substrate, the liquid crystal diffuse toward the periphery of the color filter substrate and will contact the sealant upon bonding of the array substrate and the color filter substrate. Because solidification of the sealant needs a period of time, the liquid crystal will be contaminated if it contact with the sealant which is in an incompletely solidified state. If the liquid crystal degenerates due to contamination by the sealant, it may not deflect normally under pixel electric fields, leading to a poor phenomenon of whitening which occurs on the periphery of the crystal liquid display.

As regards a prior art liquid crystal display, there is a problem that liquid crystal at an inner edge of the panel may be contaminated.

SUMMARY

According to an embodiment of the disclosed technology, there is provided a liquid crystal display comprising: a first substrate including a base substrate and films formed on the base substrate; a second substrate, the periphery of the first substrate and the periphery of the second substrate being bonded together with use of a sealant, and a side of the first substrate on which the films are formed facing the second substrate; and a liquid crystal layer, filled in a closed space which is located between the first substrate and the second substrate and is sealed by the sealant, wherein the closed space includes an active region disposed at a central part and a dummy region surrounding the active region and located closely to the sealant, and a total thickness of the film formed on the base substrate of the first substrate in correspondence to the active region is smaller than a total thickness of the film formed on the base substrate of the first substrate in correspondence to the dummy region.

According to another embodiment of the disclosed technology, three is provided an electronic apparatus comprising a liquid crystal display in accordance with any embodiment of the disclosed technology.

According to still another embodiment of the disclosed technology, there is provided a method of manufacturing a liquid crystal display comprising: preparing a base substrate, the base substrate including an active region at the center and a dummy region surrounding the active region; forming films on the active region and dummy region of the base substrate so as to form a first substrate, wherein a total thickness of the film formed in the active region is smaller than a total thickness of the film formed in the dummy region; preparing a second substrate and coating a sealant on the periphery of the second substrate; dropping liquid crystal material in an area corresponding to the active region on a side of the first substrate formed with the films; and aligning the first substrate and the second substrate in the state that the side of the first substrate formed with the films faces a side of the second substrate coated with the sealant, bonding the first substrate and the second substrate and sealing the liquid crystal material with use of the sealant.

Further scope of applicability of the disclosed technology will become apparent from the detailed description given hereinafter. However, it should be understood that the detailed description and specific examples, while indicating preferred embodiments of the disclosed technology, are given by way of illustration only, since various changes and modifications within the spirit and scope of the disclosed technology will become apparent to those skilled in the art from the following detailed description.

BRIEF DESCRIPTION OF THE DRAWINGS

The disclosed technology will become more fully understood from the detailed description given hereinafter and the accompanying drawings which are given by way of illustration only, and thus are not limitative of the disclosed technology and wherein.

DETAILED DESCRIPTION

Embodiments of the disclosed technology now will be described more clearly and fully hereinafter with reference to the accompanying drawings, in which the embodiments of the disclosed technology are shown. Apparently, only some embodiments of the disclosed technology, but not all of embodiments, are set forth here, and the disclosed technology may be embodied in other forms. All of other embodiments made by those skilled in the art based on embodiments disclosed herein without mental work fall within the scope of the disclosed technology.

Figure 1:
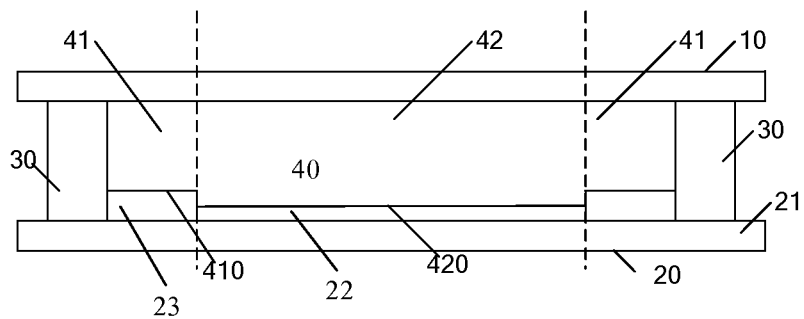
FIG. 1 is a cross-sectional schematic view showing a liquid crystal display according to an embodiment of the disclosed technology.

For solving a problem occurring in a prior art liquid crystal display that liquid crystal may be contaminated, a first embodiment of the disclosed technology provides a liquid crystal display. Now referring to FIG. 1, a liquid crystal display 100 according to the first embodiment of the disclosed technology comprises a color filter substrate 20 and an array substrate 10, the periphery of the color filter substrate 20 and the periphery of the array substrate 10 being bonded together with use of a sealant 30. A closed space for filling liquid crystal therein is located between the two substrates and is surrounded by the sealant. An area of the closed space which is close to the sealant 30, i.e. an area of the display which is close to an edge thereof, is a dummy region 41; and an area of the closed space which is far from the sealant 30, i.e. the central area of the display, is an active region 42 which corresponds to an area of the display for displaying an image. A distance from a contacting surface 420 between liquid crystal layer 40 and a film 22, which is formed on a base substrate 21 (e.g., a glass substrate) of the color filter substrate 20 in correspondence to the active region 42, to the base substrate 21 of the color filter substrate 20, is smaller than a distance from a contacting surface 410 between the liquid crystal layer 40 and a film 23, which is formed on the base substrate 21 of the color filter substrate 20 in correspondence to the dummy region 41, to the base substrate 21 of the color filter substrate 20. That is, a total thickness of the film 22, which is formed on the base substrate 21 in correspondence to the active region 42, is smaller than a total thickness of the film 23, which is formed on the base substrate 21 in correspondence to the dummy region 41. As seen from the above structure, because the contacting surface, which is formed between the film on the color filter substrate side in correspondence to the active region and the liquid crystal, is lower than the contacting surface, which is formed between the film on the color filter substrate side in correspondence to the dummy region and the liquid crystal layer, a speed of diffusion of the liquid crystal toward the periphery of the color filter substrate becomes slow after it is dropped in the active region, thereby reducing the possibility of the liquid crystal being contaminated.

Figure 2:
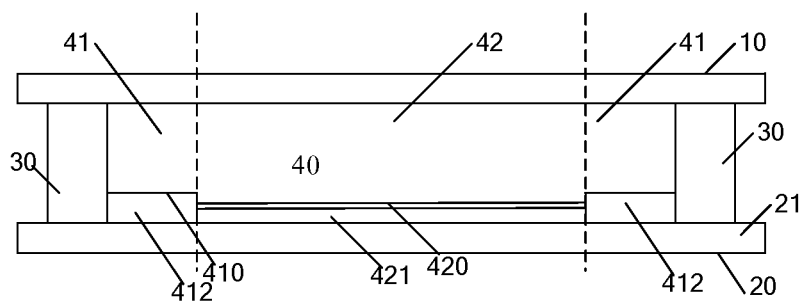
FIG. 2 is a cross-sectional schematic view showing a TN type liquid crystal display, which has a thickened black matrix layer in a dummy region, according to an embodiment of the disclosed technology.
Figure 3:
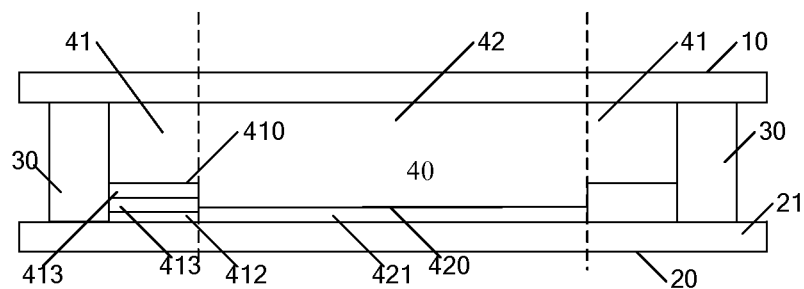
FIG. 3 is a cross-sectional schematic view showing a TN type liquid crystal display, which includes a plurality of color filter layers in the dummy region, according to an embodiment of the disclosed technology.

For the sake of illustrative convenience, an embodiment according to the disclosed technology was described in detail with reference to an example in which the color filter substrate 20 and the array substrate 10 are arranged horizontally and the array substrate 10 is on top. For a twisted nematic (TN) mode liquid crystal display, in correspondence to the active region 42, a color filter layer 421 is formed on the base substrate 21 of the color filter substrate 20, and in correspondence to the dummy region 41 of the closed space which is close to the sealant 30, a barrier layer contacting the liquid crystal directly is formed on the base substrate 21 of the color filter substrate 20. Individual films 22 corresponding to the active region 42 comprises the color filter layer 421 (other layers may be disposed on the color filter layer 421). To ensure a surface of the liquid crystal in the active region 42 is lower than a surface of the liquid crystal in the dummy region 41, a thickness of the barrier layer in the dummy region 41 should be larger than a total thickness of individual films 22 in the active region 42. In order to avoid the liquid crystal from being secondarily contaminated, for example, a material not contaminating the liquid crystal can be chosen as material for the barrier layer. Further, as shown in FIG. 2, in order to prevent the process from becoming overly complex due to a change on the existing process, the barrier layer can be implemented by employing the black matrix (BM), comprising but not limited to the BM. As such, because a BM layer is also needed to be formed on the base substrate 21 of the color filter substrate 20 in correspondence to the dummy region 41 in prior art, the only consideration in the process is to thicken the thickness of a BM layer 412 according to an embodiment of the disclosed technology (to be a thickness larger than a total thickness of the films in the active region). Alternatively, as shown in FIG. 3, the barrier layer can be implemented by employing a BM layer 412 and a color filter layer 413 formed on the BM layer 412, comprising but not limited to the BM and the color filter layer formed thereon. In order to obtain a relatively large height difference between the barrier layer in the dummy region 41 and the individual films in the active region, at least two color filter layers 413 can be formed on the BM layer 412.

Regarding a Fringe Field Switching (FFS) liquid crystal display in prior art, liquid crystal in the dummy region 41 and the active region 42, which is close to the color filter substrate 20 side, contact with a OC layer (a protective film) on the same plane. To achieve an object of the disclosed technology, with respect to the FFS liquid crystal display, the OC layer in the dummy region 41 should be thickened, such that a surface of liquid crystal on the color filter substrate 20 side in the active region 42 is closer to the base substrate 21 of the color filter substrate 20 as compared to a surface of liquid crystal on the color filter substrate 20 side in the dummy region 41.

Figure 4:
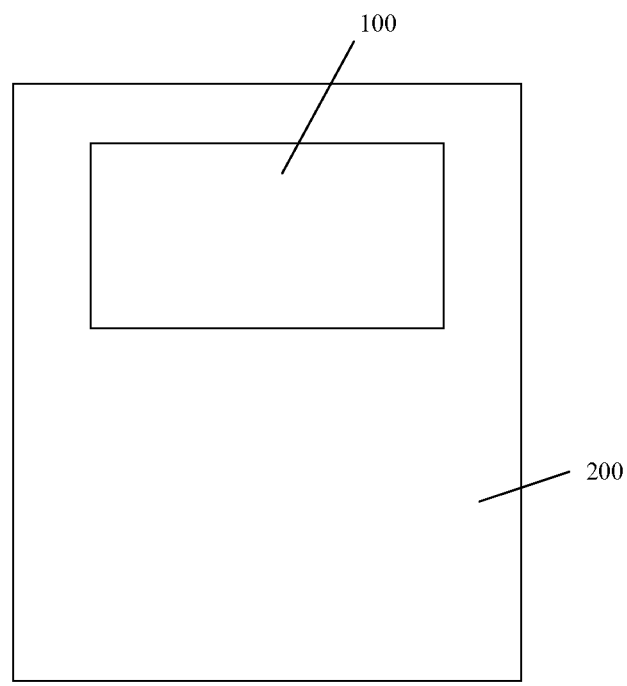
FIG. 4 is a structural schematic view showing an electronic apparatus according to an embodiment of the disclosed technology.

A second embodiment of the disclosed technology provides an electronic apparatus, as shown in FIG. 4, a body 200 of the electronic apparatus has the foregoing liquid crystal display 100 disposed thereon.

A third embodiment of the disclosed technology provides a method of manufacturing a liquid crystal display, and the method comprises the following steps.

In step 201, films are formed on a base substrate (e.g., a glass substrate) 21 of a color filter substrate 20 in correspondence to an active region and a dummy region, respectively. The active region corresponds to the central portion of the base substrate, and the dummy region is located around the active region.

In step 202, liquid crystal is dropped in the active region of a color filter substrate 20 and a sealant 30 is coated on the periphery of an array substrate 10.

In step 203, the color filter substrate 20 and the array substrate 10 are precisely aligned with a pixel-to-pixel basis, and are bonded with the sealant 30, and the liquid crystal is sealed.

Before performing the above steps, a step of preparing the array substrate 10 and the color filter substrate 20 is performed firstly. The process for preparing the array substrate 10 and the color filter substrate 20 is as follows. The fabrication of the array substrate 10 mainly comprises forming an array of thin film transistors by semiconductor technologies such as a film-forming technology, a photolithography technology, an etching technology, and so on. A process of forming films in the active region and the dummy region on the color filter substrate 20 side is substantially as follows: forming a black matrix (BM) layer in the dummy region of the color filter substrate, or, further forming a color filter layer on the BM; and then forming respective color filter layers of red, green and blue (RGB) in the active region 42, wherein a total thickness of the film formed in the dummy region is larger than a total thickness of the film formed in the active region. A process for fabricating a liquid crystal cell in the step 203 comprises: bonding the two substrates and sealing the liquid crystal material with the sealant 30, after the prepared color filter substrate 20 and array substrate 10 are precisely aligned with a pixel-to-pixel basis; and then cutting the bonded substrates into a finally required size of the display panel. Embodiments of the disclosed technology have such a character: in the active region 42, a film on the color filter substrate 20 side forms a contacting surface with the liquid crystal, and in the dummy region 41, a film on the color filter substrate 20 side forms a contacting surface with the liquid crystal, wherein the contacting surface between the film on the color filter substrate 20 side and the liquid crystal in the active region 42 is closer to the base substrate of the color filter substrate as compared to the contacting surface between the film on the color filter substrate 20 side and the liquid crystal in the dummy region 42. That is, a total thickness of the film formed on the base substrate of the color filter substrate in the active region is smaller than a total thickness of the film formed on the base substrate of the color filter substrate in the dummy region.

Embodiments of the disclosed technology newly devise the film on the color filter substrate 20 side in the active region 42 and the film on the color filter substrate 20 side in the dummy region 41 on the basis of a prior art liquid crystal display, such that a height difference is formed between contacting surfaces in contact with the liquid crystal in the two regions (a contacting surface in contact with the liquid crystal in the dummy region 41 is high). Thus, a speed of diffusion of the liquid crystal toward the periphery of the color filter substrate becomes slow after they are dropped in the active region, thereby reducing the possibility of the liquid crystal being contaminated.

Regarding the liquid crystal display and the method thereof, and the electronic apparatus in accordance with the disclosed technology, description is made with reference to an example in which films with different thicknesses are formed on the color filter substrate in correspondence to the active region and the dummy region, respectively. Here, liquid crystal is dropped on the color filter substrate upon fabricating the liquid crystal display, so as to slow down diffusion of the liquid crystal toward the periphery. However, embodiments in accordance with the disclosed technology are not limited thereto. Films with different thicknesses can also be formed on the array substrate in correspondence to the active region and the dummy region, respectively, and a total thickness of the film formed in correspondence to the active region is smaller than a total thickness of the film formed in correspondence to the dummy region. In this case, dropping liquid crystal on the array substrate upon fabricating the liquid crystal display can also slow down diffusion of the liquid crystal toward the periphery, so as to reduce contamination of the liquid crystal.

Additionally, while a TN type liquid crystal display and a FFS type liquid crystal display were described above as illustrative examples, the disclosed technology is not limited thereto. The disclosed technology may be applicable to various different type liquid crystal displays, such as, an In-plane switching (IPS) type liquid crystal display. Provided that films on a substrate for dropping of liquid crystal is formed as above to be different thicknesses corresponding to the active region and the dummy region, an object of slowing down diffusion of the liquid crystal toward the periphery can be achieved.

It should be noted that the above embodiments only have the purpose of illustrating the disclosed technology, but not limiting it. Although the disclosed technology has been described with reference to the above embodiment, those skilled in the art should understand that modifications or alternations can be made to the solution or the technical feature in the described embodiments without departing from the spirit and scope of the disclosed technology.

What is claimed is:

1. A method of manufacturing a liquid crystal display, comprising:
    preparing a base substrate, the base substrate including an active region at the center and a dummy region surrounding the active region;
    forming films on the active region and dummy region of the base substrate so as to form a first substrate, wherein a total thickness of the film formed in the active region is smaller than a total thickness of the film formed in the dummy region;
    preparing a second substrate and coating a sealant on the periphery of the second substrate;
    drip-irrigating liquid crystal material in an area corresponding to the active region on a side of the first substrate formed with the films; and
    aligning the first substrate and the second substrate in the state that the side of the first substrate formed with the films faces a side of the second substrate coated with the sealant, bonding the first substrate and the second substrate and sealing the liquid crystal material with use of the sealant.

2. The method of claim 1, wherein the first substrate is a color filter substrate, the second substrate is an array substrate, forming films on the base substrate comprises: forming a barrier layer in the dummy region and a color filter layer in the active region.

3. The method of claim 2, wherein the barrier layer comprises a black matrix layer.

4. The method of claim 2, wherein the barrier layer comprises a black matrix layer and a color filter layer formed on the black matrix layer.

* * * * *